Patented June 24, 1930

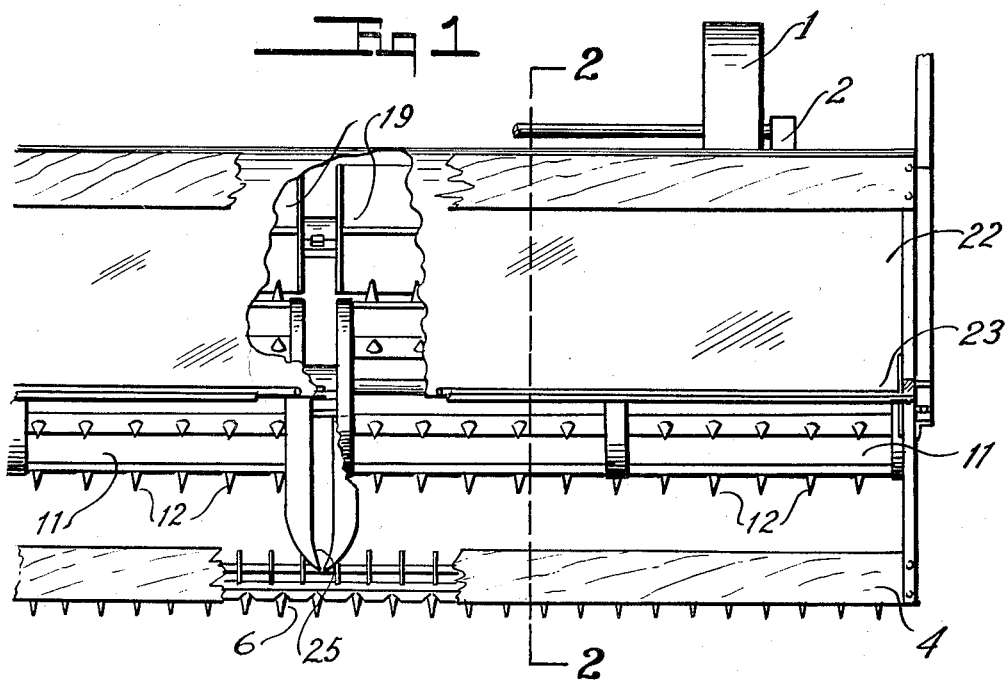
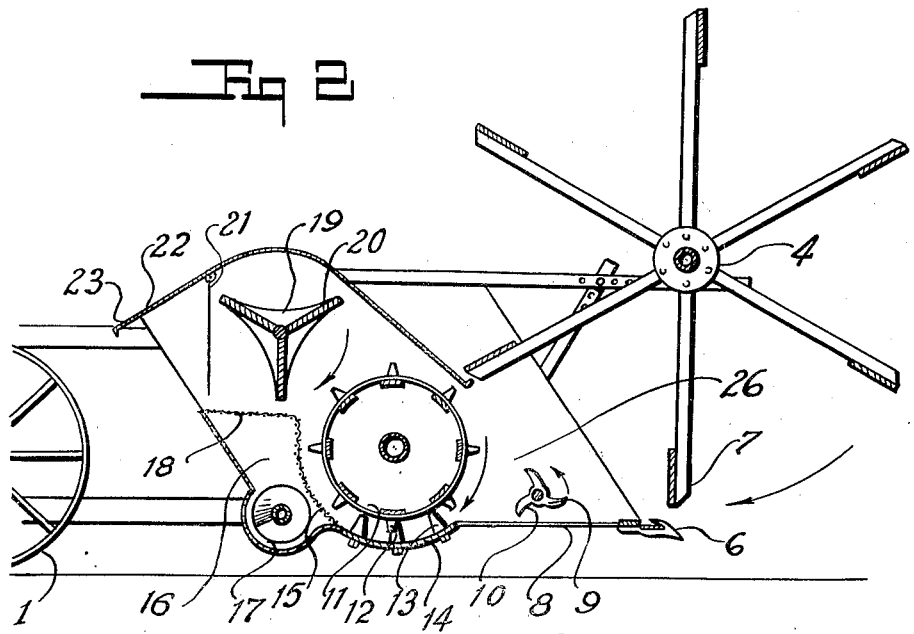

1,765,582

UNITED STATES PATENT OFFICE

WILLIAM L. HANLON, OF STERLING, KANSAS

COMBINED HARVESTING AND THRASHING MACHINE

Application filed July 5, 1927. Serial No. 203,559.

This invention relates to a combined harvester and thrasher, the primary object being to provide a combined harvester and thrasher mechanism in a compact form and to provide the thrashing mechanism of such construction that it will be effective substantially throughout the width of the harvesting mechanism.

Combined harvesting and thrashing mechanism or "combines", as they are generally termed, employ harvesting mechanism of the cutter bar type. The cutter bars usually run the entire width of the machine. The harvested heads of grain are then usually fed by a conveyor to a thrashing mechanism located at one end of the machine. The unthrashed grain is not infrequently fed to the thrashing mechanism faster than the thrashing mechanism can take care of it, consequently, the thrasher becomes more or less congested so that the separation is not always effective. With my invention, the grain will be fed at a uniform rate and at a substantially uniform density entirely across the machine so that liability of congestion will be prevented. The simplicity of the mechanism is another important feature. For example, the thrashing mechanism is arranged so that it will discharge and spread the straw and other refuse over the ground in rear of the machine while the grain may be conveyed to a suitable point to be collected either in a bin or sacked.

The novelty of the invention will be clearly apparent with reference to the following description in connection with the accompanying drawing in which:

Fig. 1 is a front plan view, below the eye, of a combined harvesting and thrashing mechanism constructed in accordance with my invention and Fig. 2 is a vertical cross-sectional view through the same.

The mechanism can be suitably supported upon wheels, one wheel designated 1 is shown in the drawing although, obviously at least, two wheels will be required to support the frame generically designated 2. The arrangement of the wheels, however, is unimportant. The reel 4 is driven, in an appropriate manner, from the driving mechanism of the machine. The reel 4 is properly placed with respect to the cycle bars or cutter bars 6. This is all old construction as it is quite common to drive the reel from the driving mechanism of the machine and to cut the grain by cycle bars slightly below the ends of the cross-bars 7 of the reel. The cut grain is received on a table 8 above which is a feeder 9 rotating in a contra-clockwise direction. The feeder 9 has a plurality of radial teeth 10, as clearly seen in Fig. 2. The feeder extends entirely across the machine and feeds the cut grain directly into the cylinder and concave. The cylinder 11 is provided with the usual teeth 12 co-acting with the teeth 13 in the concave 14 to thrash the grain. The teeth, obviously, may take any conventional form, either spike or rasp shape. The concave is in the form of a grid 15 so that the kernels of the grain, which have been thrashed, may be forced through the grid into the grain chamber 16 and conveyed to the end of the machine by a conveyor 17 to be received by a cleaner and then to an elevator to dump it into a bin or to discharge it into sacks. The grid 15 extends upwardly and terminates in a horizontal table 18 above which is a beater 19 having radial blades 20. The grain kernels will drop through the grid-shaped table 18 into the grain chamber 16. Since the beater 19 rotates in a clockwise direction, the straw, chaff, etc., will be forced past the baffle plate 21 hinged to the top cover plate 22 and it will be deflected by the extension or apron 23 on to the ground in rear of the machine, so as to serve as fertilizer for the ground. At the substantially transverse center of the machine, I provide a guard 25 to cover the center support 25' for the beater and cylinder.

It will be apparent that the cut grain or heads will be received on the receiving table 8 in a spread out condition substantially as they are harvested and that they will be fed directly back through the throat 26 into the cylinder and concave, whereby the grain will be separated from the straw, the straw being subjected to a final beating before the straw is spread out over the ground in rear of the machine.

The arrangement above described and illustrated in the accompanying drawing will prevent congestion of the machine and it will allow the machine to pass through the field at a rapid rate because the liability of the machine congesting will be practically prevented.

What I claim and desire to secure by Letters Patent is:—

1. A combined harvester and thrasher, comprising a frame, cutter bars in front of the frame, a feeder in rear of the cutter bars co-extensive with the lengths of the cutter bars, a cylinder and concave in rear of the feeder co-extensive with the lengths of the cutter bars, a beater above and in rear of the cylinder and concave and straw discharging means in rear of the beater and in rear of the cylinder and concave.

2. A combined harvester and thrasher, comprising a frame, cutter bars in front of the frame, a feeder in rear of the cutter bars co-extensive with the lengths of the cutters having a guard located at its transverse center extending forwardly to the cutter bars, a cylinder and concave in rear of feeder co-extensive with the lengths of the cutter bars, a beater above and in rear of the cylinder and concave, and straw discharging means in rear of the beater and in rear of the cylinder and concave.

In testimony whereof I affix my signature.

WILLIAM L. HANLON.